US012643118B2

(12) United States Patent
  Senkbeil, Jr.

(10) Patent No.:  US 12,643,118 B2
(45) Date of Patent:       Jun. 2, 2026

(54) MODULAR AIR FILTRATION HOUSING AND SYSTEM

(71) Applicant: PaintMaxx LLC, Jasper, GA (US)

(72) Inventor: Paul H. Senkbeil, Jr., Big Canoe, GA (US)

(73) Assignee: PaintMaxx LLC, Jasper, GA (US)

( * ) Notice:  Subject to any disclaimer, the term of this patent is extended or adjusted under 35 U.S.C. 154(b) by 659 days.

(21) Appl. No.: 17/898,602

(22) Filed: Aug. 30, 2022

(65) Prior Publication Data

US 2024/0068681 A1      Feb. 29, 2024

(51) Int. Cl.
  *B05B 14/43*      (2018.01)
  *B01D 46/00*      (2022.01)
  *B01D 46/10*      (2006.01)
  *B01D 46/58*      (2022.01)
  *F24F 8/108*      (2021.01)

(52) U.S. Cl.
  CPC .......... *B05B 14/43* (2018.02); *B01D 46/0006* (2013.01); *B01D 46/10* (2013.01); *B01D 46/58* (2022.01); *F24F 8/108* (2021.01); *B01D 46/0001* (2013.01); *B01D 46/0009* (2013.01); *B01D 46/0016* (2013.01); *B01D 2265/06* (2013.01)

(58) Field of Classification Search
  CPC ..... F24F 8/108; B01D 46/0006; B01D 46/10; B01D 46/0009; B01D 46/12; B01D 46/58; B01D 46/0005; B01D 46/0001; B01D 46/0016; B01D 2265/06
  See application file for complete search history.

(56) References Cited

U.S. PATENT DOCUMENTS

| | | | | |
|---|---|---|---|---|
| 6,378,227 | B1 * | 4/2002 | Bradford ................. | F24F 13/14 |
| | | | | 34/235 |
| 9,993,835 | B2 | 6/2018 | Slama et al. | |
| 10,596,585 | B2 | 3/2020 | Slama et al. | |
| 11,014,113 | B2 | 5/2021 | Slama et al. | |
| 2014/0298764 | A1 | 10/2014 | Haufe et al. | |
| 2016/0263506 | A1 * | 9/2016 | Gavran ................. | B01D 50/20 |
| 2016/0288036 | A1 * | 10/2016 | Wieland ................. | B01D 46/58 |
| 2020/0376152 | A1 * | 12/2020 | Krosney ................... | A61L 9/20 |
| 2021/0146292 | A1 * | 5/2021 | Senkbeil, Jr. .......... | B01D 46/58 |
| 2022/0055058 | A1 * | 2/2022 | Baizel .................... | B01D 46/48 |
| 2022/0184651 | A1 * | 6/2022 | de Borchgrave ....... | B05B 14/43 |
| 2023/0064304 | A1 * | 3/2023 | Schumacher .......... | B01D 39/16 |
| 2023/0321682 | A1 * | 10/2023 | Salazar ................... | B05B 14/43 |
| | | | | 118/326 |

* cited by examiner

*Primary Examiner* — Gabriel E Gitman
(74) *Attorney, Agent, or Firm* — TROUTMAN PEPPER LOCKE LLP; James E. Schutz; Korbin M. Blunck

(57)      ABSTRACT

The disclosed technology relates to air filters and filter assemblies for filtering particulates from air, and more particularly to for filtering paint particulates from air. The disclosed technology can include a filter support frame having a plurality of air filter receptacle shelves configured to support a plurality of air filter boxes, a tray receptacle configured to receive a removable tray, an inlet configured to receive a mixture of air and particulates and channel a mixture of air and particulates across the removable tray toward the plurality of air filter boxes, an outlet configured to receive filtered air from the plurality of air filter boxes and channel the filtered air out of the filter support frame, and a base configured to support a removable plenum. The removable tray can be configured to collect particulates.

19 Claims, 10 Drawing Sheets

230

150

162

160

161

210

211

214

213

214

210

213

214

Air Flow

Air Flow

211

212

MODULAR AIR FILTRATION HOUSING AND SYSTEM

FIELD OF THE DISCLOSURE

The present disclosure relates generally to air filters and filter assemblies for filtering particulates from air, and more particularly to for filtering paint particulates from air.

BACKGROUND

For centuries paint has been used to protect and beautify materials. Traditionally, paint is applied to a surface using a paintbrush, roller, or other device which soaks up the paint and then applies it to the surface by physical contact. However, a more recent method of painting utilizes compressed gasses (e.g., compressed air, propane, butane, isobutane, methyl ethyl, nitrous oxide, or carbon dioxide, etc.) to create an aerosol mixture of paint particles and gas to apply paint to a surface. The resultant aerosol mixture is propelled from a spray device and the paint particles are applied to the surface in a constant stream allowing the user to rapidly apply paint to a surface. Although this form of painting may save time, and potentially create better finishes, there are dangers associated with using this painting method including inhaling toxic fumes and paint particulates.

To reduce the danger of inhaling toxic fumes and paint particulates, various methods of filtering out the toxic particulates from the air have been developed. For example, air filtration systems help to reduce harmful particulates in the air. Furthermore, designated paint booths can be used to isolate the area where paint fumes may exist from other areas where one would expect clean air. Air filtration systems are used to provide a fresh supply of breathable air to the painters inside the paint booth and filter out particulates from air exiting the paint booth.

To capture the harmful fumes and particulates exiting a paint booth, various types of filters are used. One type of filter comprises a rectangular (e.g., a square) box-shaped filter which has filter media placed inside of the filter box to capture paint particulates and allow filtered air to exit to the atmosphere or be recirculated through the air filtration system. The box filter can be disposed once it has reached the end of its usable life. Many current designs of box filters utilize a series of cardboard baffles or shredded paper for filter media. However, these designs tend to prematurely clog up the entrance of the filter rather than utilize the entire filter media available leading to an ineffective use of the filter media. Furthermore, these designs are cumbersome to assemble causing the user frustration and increasing the margin for error in the assembly of the filter.

Some existing air filters include a large filter assembly that includes one or more filters to collect particulates. These large filter assemblies can sometimes be over six feet high and can weight hundreds of pounds when loaded with particulates. Replacing the filter assembly often requires more than one worker and the use of lifting equipment. Furthermore, assembling large filter assemblies can be especially cumbersome and time consuming.

Accordingly, there is a need in the art for an improved filter assembly with modular components that is easier to assemble and maintain due to interchangeability of components.

BRIEF SUMMARY

An exemplary embodiment of the present disclosure provides a filter support frame comprising a plurality of air filter receptacle shelves configured to support a plurality of air filter boxes, a tray receptacle configured to receive a removable tray, the removable tray being configured to collect particulates, an inlet configured to receive a mixture of air and particulates and channel a mixture of air and particulates at least partially across the removable tray toward the plurality of air filter boxes, and an outlet configured to receive filtered air from the plurality of air filter boxes and channel the filtered air out of the filter support frame. The filter support frame can be configured to channel the mixture of air and particulates through each air filter box of the plurality of the air filter boxes simultaneously.

The filter support frame can further comprise a base configured to support a removable plenum.

The tray receptacle can be disposed proximate the inlet of the filter support frame.

The base can further comprise a groove configured to receive at least a portion of the removable plenum, and a bottom tray receptacle configured to receive a removable bottom tray configured to collect particulates. The removable plenum can be configured to channel the mixture of air and particulates through each air filter box of the plurality of the air filter boxes simultaneously.

The removable tray can be made from disposable corrugated material and the removable bottom tray can be made from disposable corrugated material.

The plurality of air filter receptacle shelves can comprise three shelves and the plurality of air filter boxes can comprise six air filter boxes.

At least one of the plurality of air filter boxes can comprise a filter box inlet, a filter box outlet, and a folded filter medium disposed between the inlet and the outlet. The filter medium can be lofted or non-woven polyester, lofted or non-woven polypropylene, filament fiberglass, polyurethane foam, electrostatic polypropylene, shredded paper, cardboard, cotton, or any other suitable filter media for the particular application.

The filter support frame can further comprise a plurality of attachment mechanisms configured to attach the removable plenum to the filter support frame.

The removable plenum can be made from a disposable corrugated material.

The filter support frame can be made from a metal material.

Another embodiment of the present disclosure provides a filter assembly comprising a filter support frame, a removable tray configured to collect particulates, and a removable plenum. The filter support frame can comprise a plurality of air filter receptacle shelves configured to support a plurality of air filter boxes, a tray receptacle, an inlet configured to receive a mixture of air and particulates, and an outlet configured to receive filtered air from the plurality of air filter boxes and channel the filtered air out of the filter support frame, wherein the filter support frame is configured to channel the mixture of air and particulates through the plurality of the air filter boxes simultaneously. The removable plenum can be configured to channel the mixture of air and particulates through each air filter box of the plurality of the air filter boxes simultaneously.

The tray receptacle is disposed proximate the inlet of the filter support frame.

The filter assembly can further comprise a base configured to receive the removable plenum. The base can comprise a groove configured to receive at least a portion of the removable plenum and a bottom tray receptacle configured to receive a removable bottom tray, the removable bottom tray configured to collect particulates.

The filter assembly can further comprise an inlet filter blanket removably attached to the filter support frame between the inlet and the plurality of air filter receptacle shelves.

The filter assembly can further comprise an outlet filter blanket removably attached to the filter support frame at the outlet.

The plurality of air filter receptacle shelves comprises three shelves and the plurality of air filter boxes comprises six air filter boxes.

The removable tray can comprise a disposable corrugated material and the removable bottom tray comprises the disposable corrugated material.

At least one of the plurality of air filter boxes can comprise a filter box inlet, a filter box outlet, and a folded filter medium disposed between the inlet and the outlet.

The filter assembly can further comprise a plurality of attachment mechanisms configured to secure the removable plenum to the filter support frame.

The removable plenum can be made from a disposable corrugated material.

The filter support frame can be made from a metal material.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain examples and figures, all examples of the present disclosure can include one or more of the features discussed herein. Further, while one or more examples may be discussed as having certain advantageous features, one or more of such features may also be used with the various examples discussed herein. In similar fashion, while examples may be discussed below as device, system, or method embodiments, it is to be understood that such examples can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the examples shown in the drawings.

DETAILED DESCRIPTION

Figure 1:
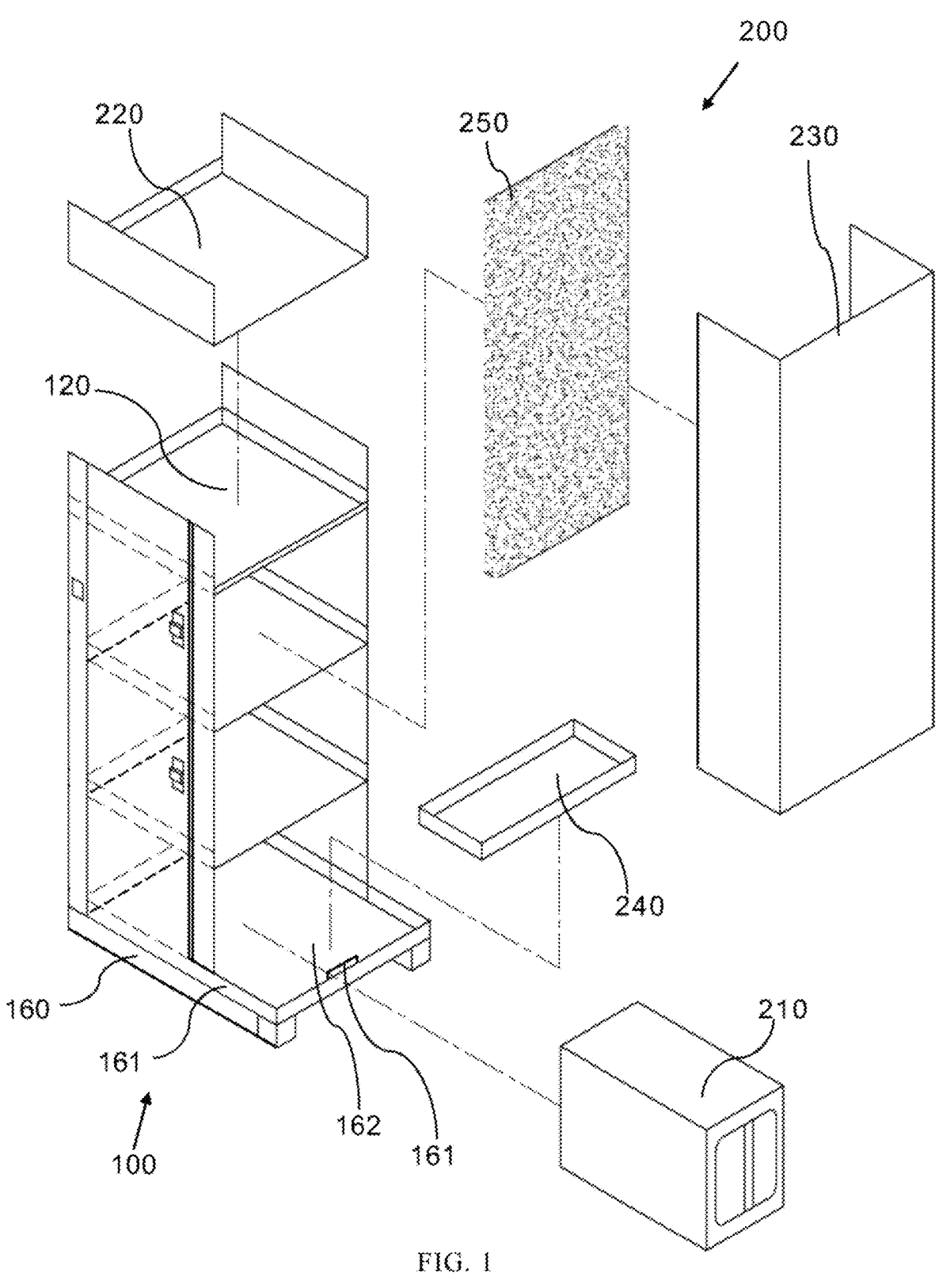
FIG. 1 provides an exploded view of a filter assembly, in accordance with the present invention.

The technology disclosed herein includes a paint filter assembly that can reduce the cost and complexity of installing and replacing industrial paint filters. Rather than having a single large paint filter that can weigh several hundred pounds when filled with paint overspray and particulates making replacement difficult, the disclosed technology includes a filter support frame and several replaceable components that can easily be exchanged when each has reached the end of its useful life. By having modular components, the disclosed technology simplifies the installation and replacement of the paint filtration system. These and other advantages will become apparent throughout this disclosure.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

It must be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms a, an, and the do not denote a limitation of quantity, but rather denote the presence of at least one of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

As shown in FIG. 1, the present disclosure provides a filter assembly (200) comprising a filter support frame (100) that can support a plurality of air filter boxes (210). The air filter support frame (100) can be configured to be installed in a portion of an air filtration system that would normally have a single large air filter box that is replaced each time it is saturated with paint overspray and particulates. In contrast with existing large air filters, the filter support frame (100) can be reusable which can help to reduce waste. Each air filter box (210) can be an individual air filter that can filter paint overspray and particulates from air and can be individually replaced only when necessary. Although only a single air filter box (210) is shown in FIG. 1, it will be appreciated that the filter support frame (100) can be configured to support multiple air filter boxes (210) (e.g., each shelf of the filter support frame 100 can support one or more air filter boxes (210)). By having a plurality of air filter boxes (210) supported by a filter support frame (100), the disclosed technology can simplify the replacement of air filters when saturated with paint overspray and particulates. The filter support frame (100) can be configured to channel the mixture of air and particulates through the plurality of the air filter boxes (210) simultaneously.

Figure 2A:
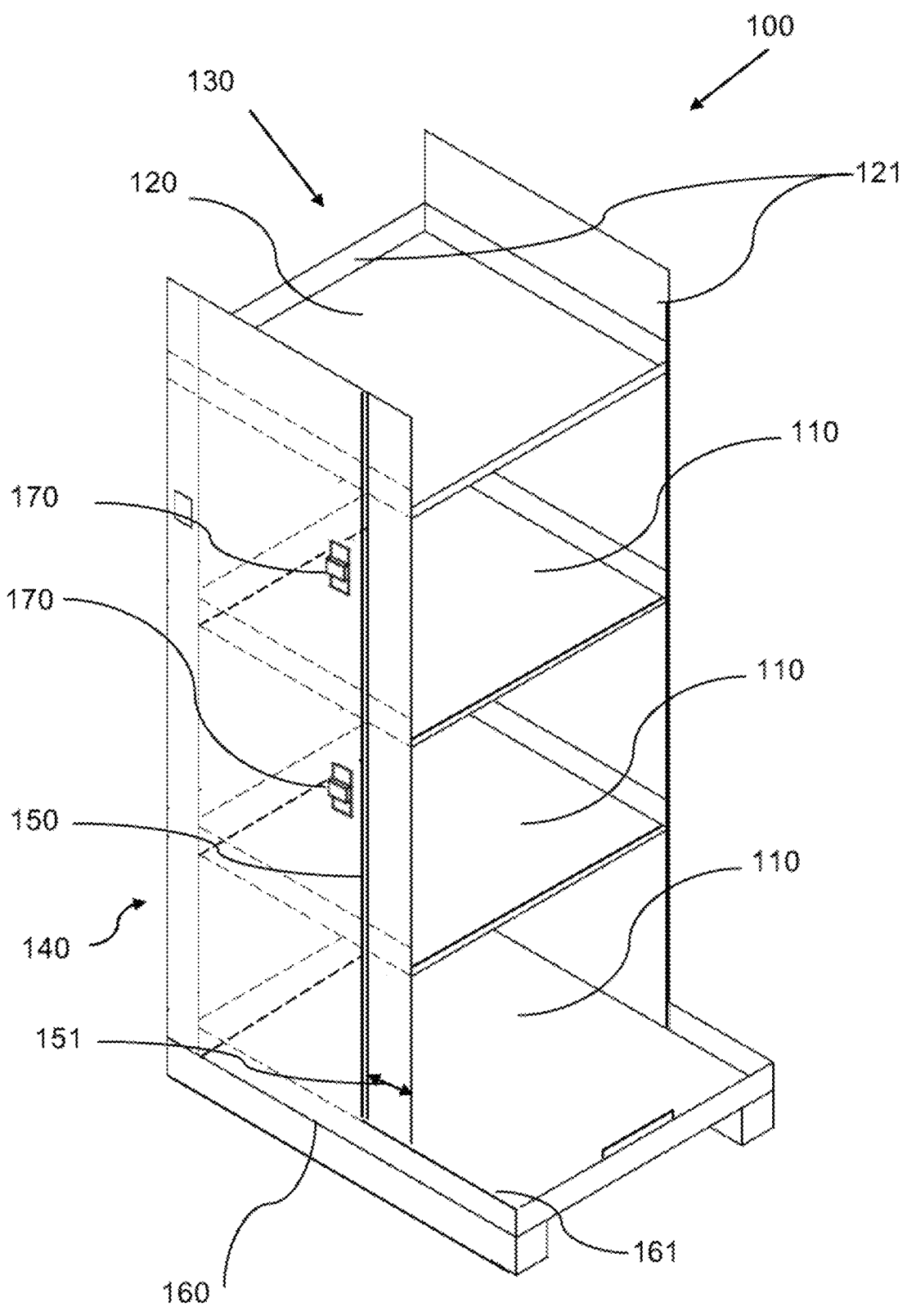
FIG. 2A provides a perspective view of a filter support frame, in accordance with the present invention.
Figure 7A:
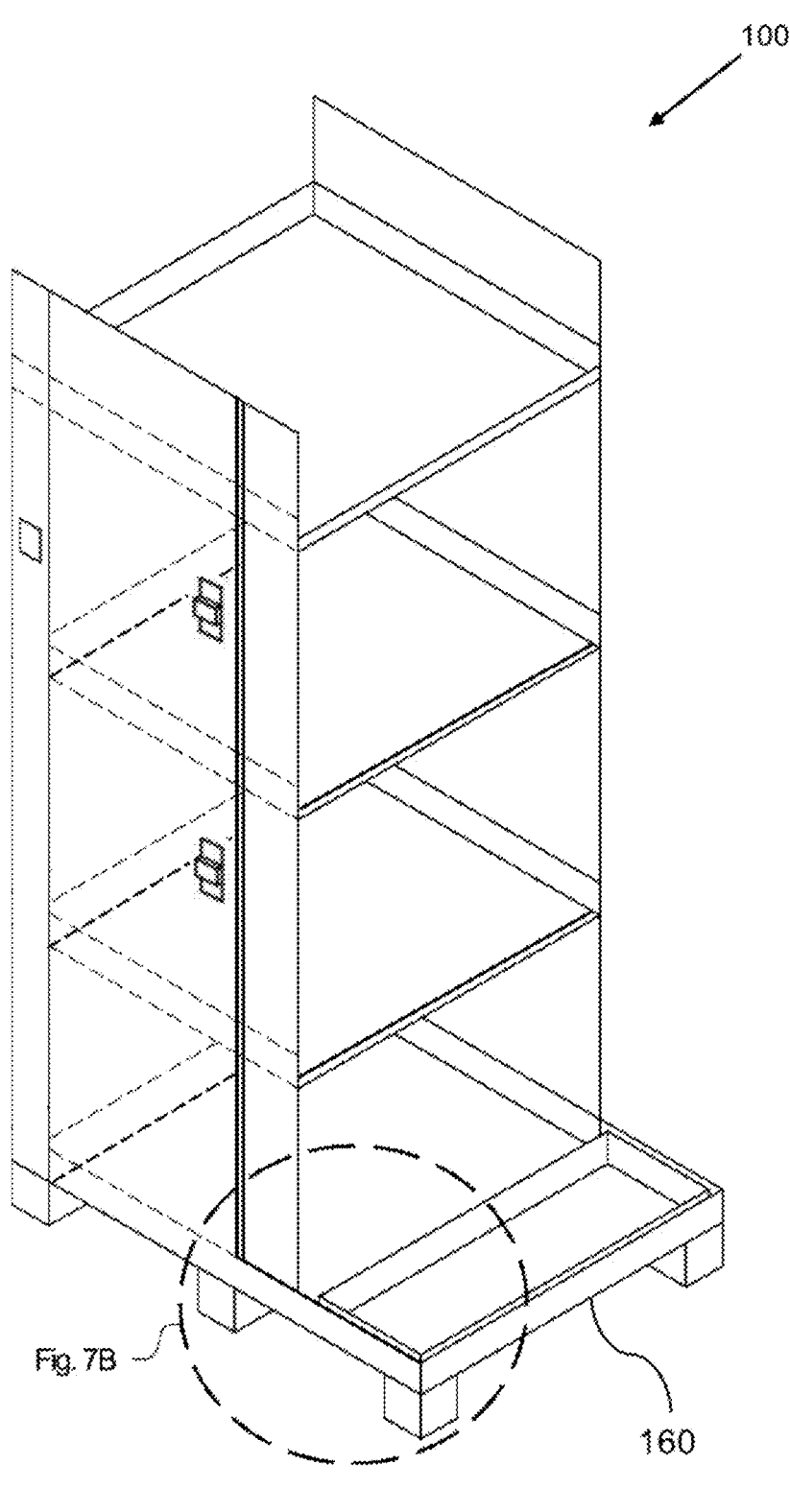
FIG. 7A provides a perspective view of a filter support frame, in accordance the present invention.

As shown in FIGS. 1 and 2A, the filter support frame (100) can include a plurality of air filter receptacle shelves (110) configured to support the plurality of air filter boxes (210), a tray receptacle (120) configured to receive the removable top tray (220), an inlet (130) configured to receive a mixture of air and particulates and channel the mixture of air and particulates across the removable top tray (220) toward the plurality of air filter boxes (210), an outlet (140) configured to receive filtered air from the plurality of air filter boxes (210) and channel the filtered air out of the filter support frame (110), and a base (160) configured to support a removable plenum (230) and a removable bottom tray (240). The tray receptacle (120) can include lips (121) that can extend upwardly to interface with the paint filtration system. In some examples, the lips (121) can be of the same height. In some examples this height can be one inch, two inches, three inches, five inches, ten inches, etc. In other examples, as shown in FIG. 2A, the lips (121) can be of differing heights. In some examples, the base (160) can be closed on certain sides and open on others as shown in FIG. 2A. In other examples, the base (160) can be open on all sides, as shown in FIG. 7A. At least the removable top tray (220), the air filter boxes (210), and the removable bottom tray (240) can be configured to collect particulates. The filter support frame (100) can also include a ridge (150) configured to engage the removable plenum (230). The ridge (150) can help to keep the removable plenum (230) in place and provide support to the removable plenum (230) to help prevent the removable plenum (230) from collapsing due to the pressure different when the filter assembly (200) is in use. In some examples, the ridge (150) can allow an overlap of the removable plenum (230) and the support frame (100) of a length (151). The length, for example, can be one inch, two inches, three inches, five inches, ten inches, or any other suitable length for the particular application. It is to be understood that the filter support frame (100) can be configured to cooperatively fit and/or otherwise be used with a variety of industrial systems that are known in the art.

The filter assembly (200) can include a base (160). The base (160) can include a groove (161) configured to receive the removable plenum (230) and a bottom tray receptacle (162) configured to receive a removable bottom tray (240). The removable bottom tray (240) can be configured to collect particulates. The base (160) can include features such as recesses, legs, or holes to enable filter assembly (200) to be moved by mechanized devices such as forklifts.

Figure 3:
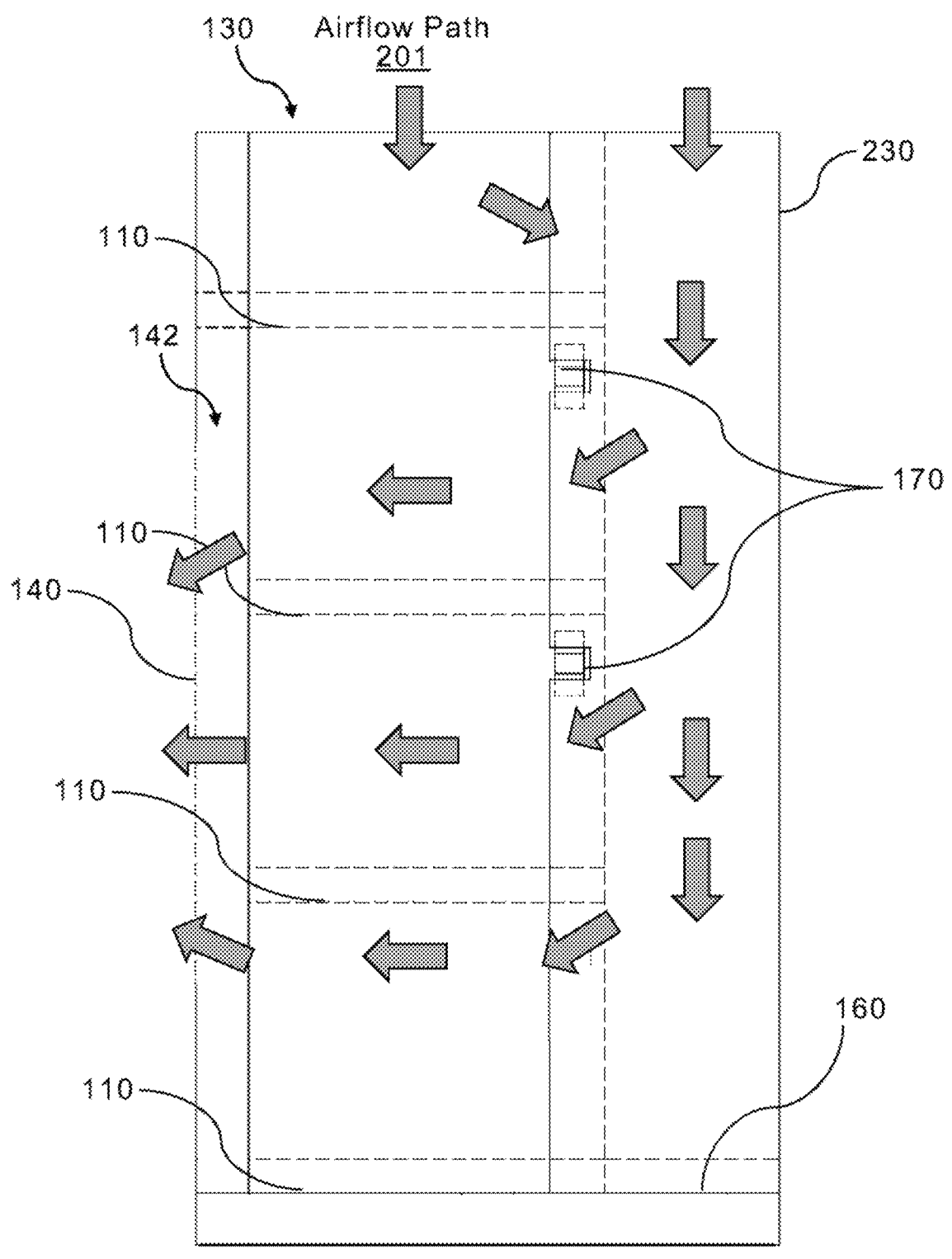
FIG. 3 provides a side view of a filter assembly, in accordance with the present invention.

The filter support frame (100) can be configured to channel the mixture of air and particulates through each air filter box (210) of the plurality of the air filter boxes simultaneously. The tray receptacle (120) can be disposed proximate an inlet (130) of the filter assembly (200). The inlet (130) can be positioned to receive a mixture of air and particulates flowing through an air filtration system. In some examples, the inlet (130) can be on a top end of the filter support frame (100) and the air and particulates can be directed through the inlet (130), down between the filter support frame (100) and the removable plenum (230), through the air filter boxes (210), and out the outlet (140) which can be located on a back side of the filter support frame (100). When fully assembled with the removable plenum (230), the filter assembly (200) can be configured to direct a mixture of air and particulates from the inlet (130), down between the removable plenum (230) and the filter support frame (100), through the air filter boxes (210), and out the outlet (140). For explanatory purposes, the arrows (201) illustrated in FIG. 3 show example paths of airflow through the filter assembly (200). As will be appreciated, however, the air flow path can be different than that shown in FIG. 3. For example, the inlet (130) can be positioned at a side or a bottom of the filter support frame (100) and the outlet (140) can be positioned on a top end, a bottom end, or any side of the filter support frame (100) depending on the particular application. Furthermore, the air filter boxes (210) can be positioned in any orientation or location so long as the airflow is passed through the air filter boxes (210) to filter the particulates from the air. As will be appreciated, portions of the air filter support frame (100) can be rolled and/or folded for structural reinforcement.

Figure 2B:
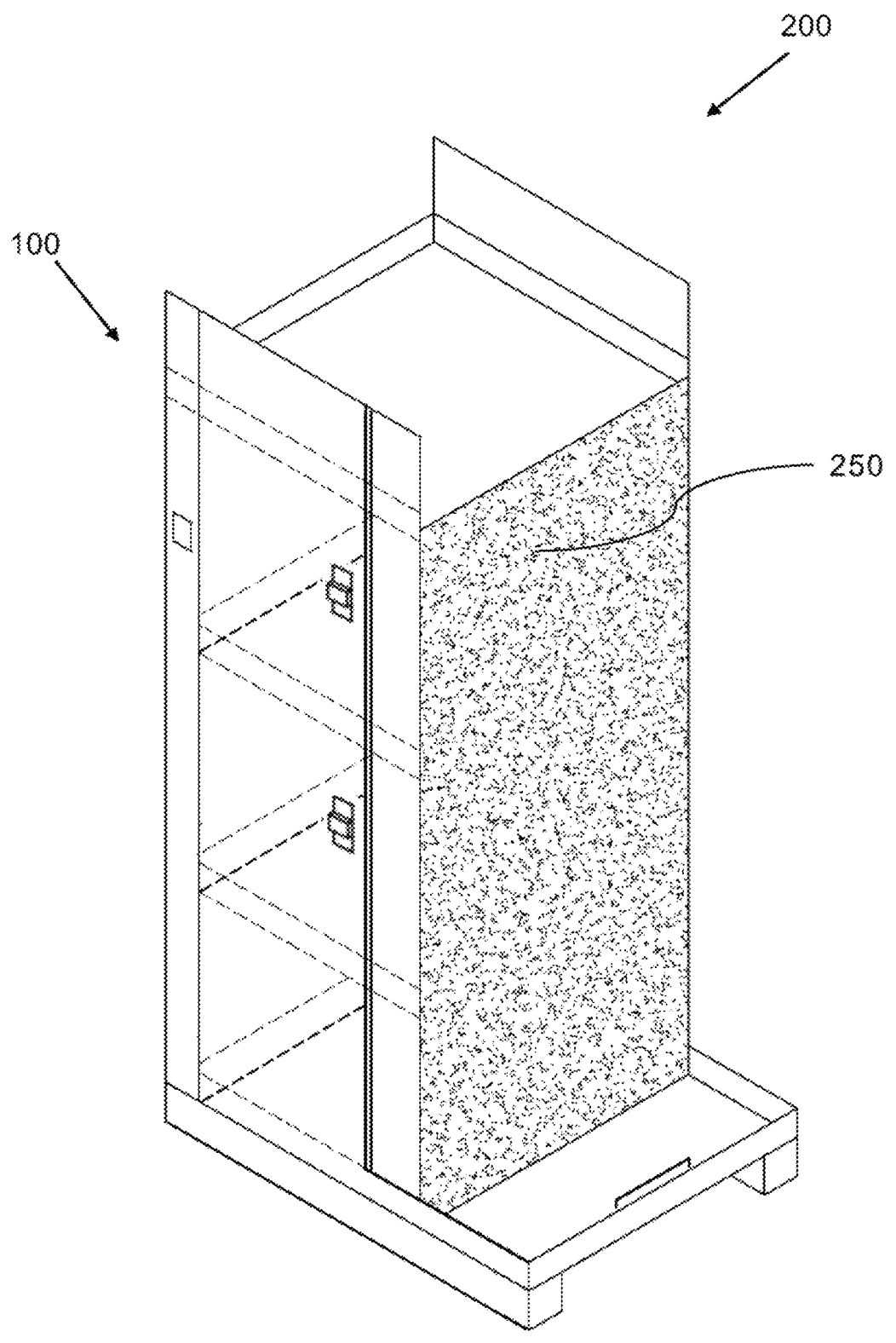
FIG. 2B provides a perspective view of a filter assembly, in accordance with the present invention.

As shown in FIGS. 1 and 2B, the filter assembly (200) can further include an inlet filter blanket (250) removably attached to the filter support frame (100) between the inlet (130) and the plurality of air filter receptacle shelves (110). The inlet filter blanket (250) can be made of a similar filter medium (213) as that of the filter boxes (210), or it can be of a different filter medium and can be configured to capture paint overspray and particulates. As will be appreciated by one of skill in the art, the inlet filter blanket (250) can help to extend the usable life of the air filter boxes (210) by capturing some additional paint overspray and particulates that would normally be captured by the paint filter boxes (210). The inlet filter blanket (250) can be removably attached to the filter support frame (100) by fasteners such as clips, clamps, bolts, screws, straps, hook-and-loop, magnets, tongue-and-groove, zippers, and the like. In this way, the inlet filter blanket (250) can be easily replaced when saturated. Thus, it is possible that the inlet filter blanket (250) can be replaced multiple times before the paint filter boxes (210) would need to be replaced depending on the particular configuration.

The filter assembly (200) can further include an outlet filter blanket (not shown) removably attached to the filter support frame (100) at the outlet (140). The outlet filter blanket can be of a similar filter medium (213) as that of the filter boxes (210) and/or the inlet filter blanket (250), or it can be of a different filter medium. It can be removably attached to the filter support frame (100) by common fasteners such as clips, clamps, bolts, screws, straps, hook-and-loop, magnets, tongue-and-groove, zippers, and the like.

As shown in FIG. 2A, the filter support frame (100) can include a plurality of attachment mechanisms (170) configured to attach the removable plenum (230) to the filter support frame (100). The attachment mechanisms (170) can include fasteners such as clips, clamps, bolts, screws, straps, hook-and-loop fasteners, magnets, tongue-and-groove joints, and the like. As will be appreciated, the attachment mechanisms 170 can enable a worker to easily remove the removable plenum (230) to access the air filter boxes (210) or other parts of the filter assembly (200).

As a non-limiting example, the air filter receptacle shelves (110) can include three shelves and the three shelves (110) can be configured to support a plurality of air filter boxes (210). For example, the three shelves (110) can each be configured to support two air filter boxes (210) (six total air filter boxes can be supported by the filter support frame (100)). As will be appreciated, however, the filter support frame (100) can include greater or fewer shelves (110) and each shelf can be configured to support greater or fewer air filter boxes (210).

Figure 4:
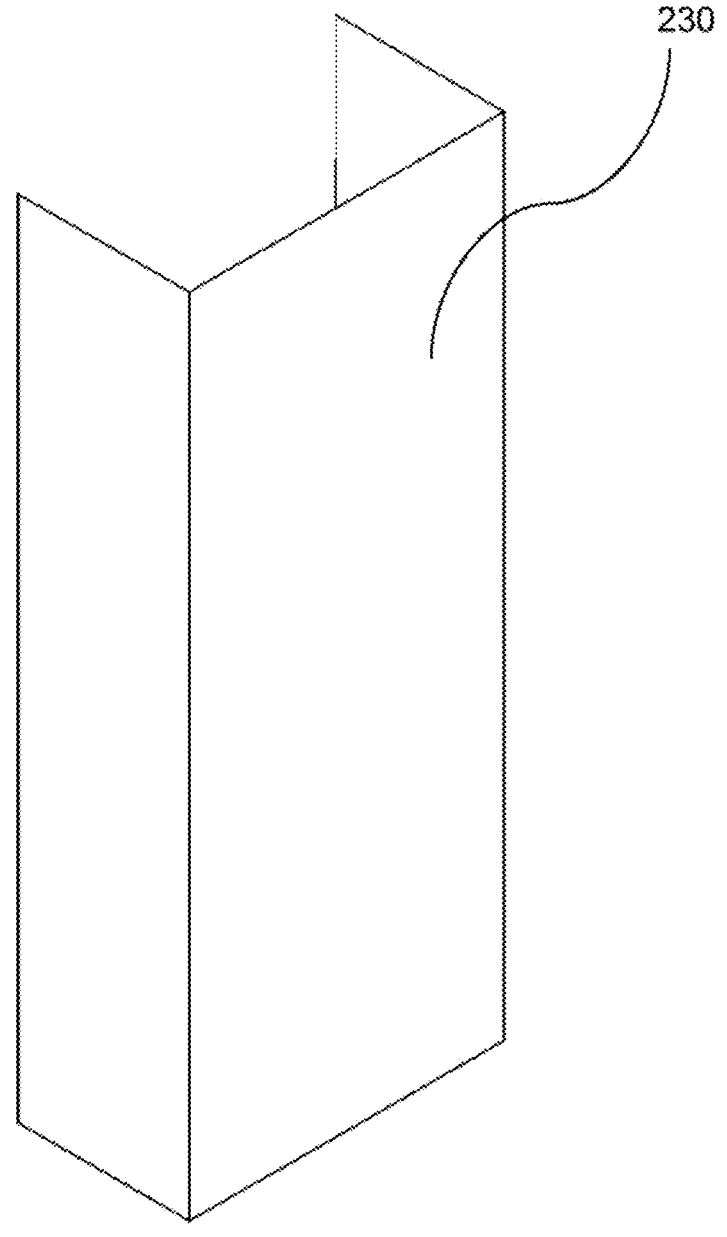
FIG. 4 provides a perspective view of a removable plenum, in accordance with the present invention.

FIG. 4 illustrates a perspective view of the removable plenum (230). The removable plenum (230) can be made from a disposable corrugated material. The corrugated material can include cardboard or similar materials. Using a disposable corrugated material such as cardboard has the advantages of being cheap and readily disposable when too much paint or other particulate matter has accumulated on the surface of the material. Disposable corrugated material can be disposed on all or some surfaces of the filter support frame to prevent paint accumulation on permanent/non-disposable surfaces. Additionally, the weight of accumulated paint overspray can be heavy enough to cause difficulty with moving, so the modularity provided by the multiple removable and/or disposable parts also decreases the physical demand on users.

Figures 5A, 5B, 6:
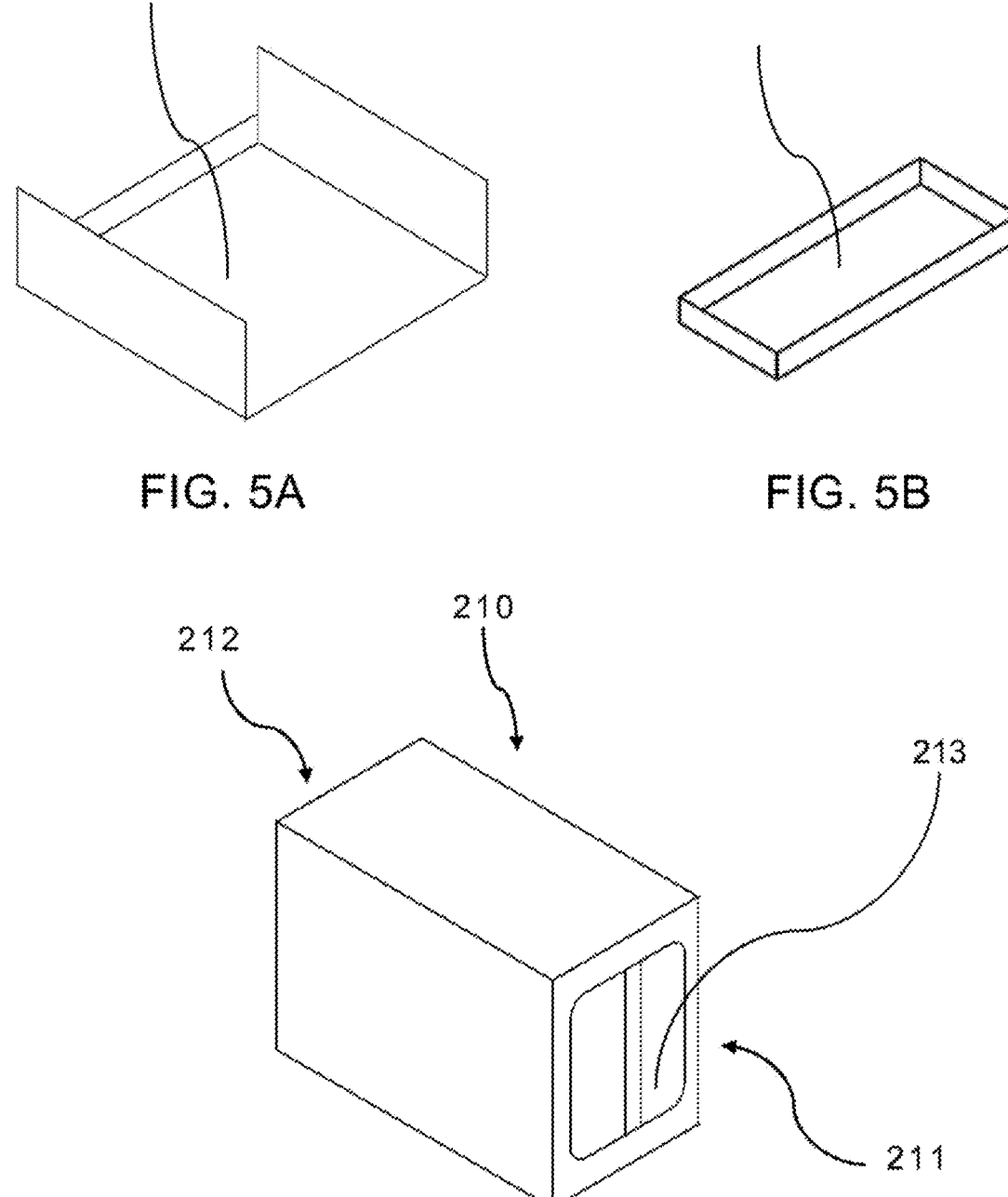
FIG. 5A provides a perspective view of a removable tray, in accordance with the present invention.
FIG. 5B provides a perspective view of a removable bottom tray, in accordance with the present invention.
FIG. 6 provides a perspective view of a filter box, in accordance with the present invention.

FIG. 5A illustrates a perspective view of the removable top tray (220). Similar to the removable plenum (230), the removable top tray (220) can be made from disposable corrugated material. The removable top tray (220) can include a flat surface which can rest on the tray receptacle (120) when the filter assembly (200) is assembled. The removable top tray (220) can also include one or more sides. The sides can be configured to form a friction fit with a perimeter of the tray receptacle (120) so that the removable top tray (220) is secured in place and not moved by the flow of a mixture of air and particulates. Each of the sides can be of the same height or different heights. These heights can be configured to contain an amount of paint overspray or other particulate matter during removal and disposal of the removable top tray (220). The removable top tray (220) can be constructed with leak-proof corners and/or edges.

FIG. 5B illustrates a perspective view of the removable bottom tray (240). Similar to the removable plenum (230) and the removable top tray (220), the removable bottom tray (240) can be made from disposable corrugated material. The removable bottom tray (240) can also include one or more sides. The sides can be configured to engage in a friction fit with a perimeter of the bottom tray receptacle (162) so that the removable bottom tray (240) is not disturbed by flow of a mixture of air and particulates. Each of the sides can be of the same height or different heights. These heights can be configured to contain an amount of paint overspray or other particulate matter during removal and disposal of the removable bottom tray. The removable bottom tray (240) can be constructed with leak-proof corners and/or edges.

As shown in FIG. 6, at least one of the plurality of air filter boxes (210) comprises a filter box inlet (211), a filter box outlet (212), and a folded filter medium (213) disposed between the filter box inlet (211) and the filter box outlet (212). The filter box (210) will be described in greater detail in relation to FIGS. 8A and 8B.

Figure 7B:
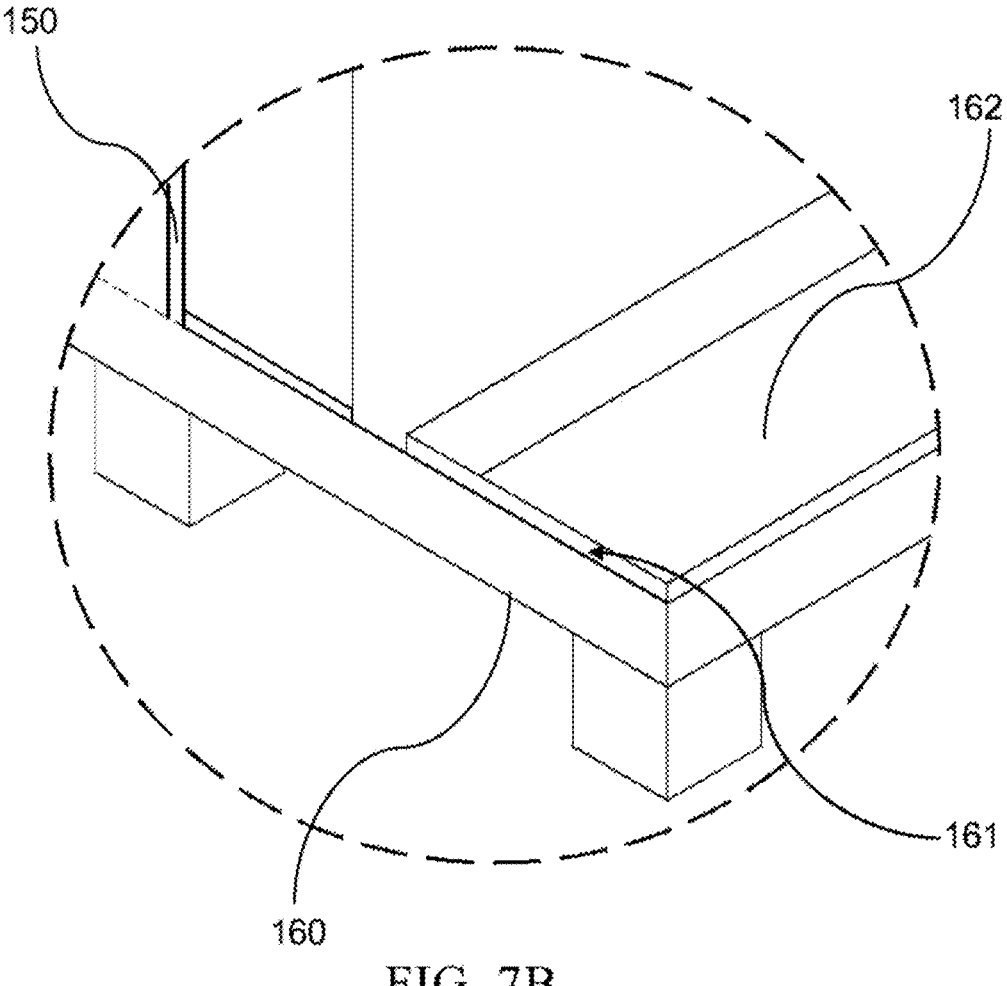
FIG. 7B provides a detail view of a base, in accordance with the present invention.

As shown in FIG. 7A and FIG. 7B, the base (160) can further include a groove (161) configured to receive at least a portion of the removable plenum (230) and a bottom tray receptacle (162) configured to receive a removable bottom tray (240) configured to collect particulates. The groove (161) can provide support for the removable plenum (230) to enable the removable plenum (230) to be made of a less rigid material than would be otherwise practical without such a supporting groove (161). The groove (161) can be sized such that the removable plenum (230) forms a friction fit with the groove (161) and is secured in place when inserted into the groove (161). The removable components disclosed herein can be removed from the filter support frame (100) and disposed of when paint accumulates on them. This reduces paint accumulation on the filter support frame and other components disclosed herein. The removable components can be secured in place with adhesives, press fits, fasteners as previously discussed, tabs disposed on the support frame configured to align with the removable component, or similar.

The filter support frame (100) can be made from a metal material. The metal material can include steel, stainless steel, aluminum, or the like. By making the filter support frame (100) from a metal material, the filter support frame (100) can be reused over and over while only replacing the portions of the filter assembly (200) that accumulate particulates (i.e., the removable plenum (230), the removable top tray (220), the removable bottom tray (240), the inlet filter blanket (250), and the outlet filter blanket). Further, the metal material can include a surface finish, polish, film, electrical charge, or coating that allows easy paint removal. Accumulation of paint overspray and other particulate matter on filter components is one of the main problems with paint booth filters. The disclosed technology provides the ability to easily remove accumulated paint overspray and saturated removable filter components such as the removable plenum (230), the removable top tray (220), the removable bottom tray (240), the inlet filter blanket (250), and the outlet filter blanket quickly and easily.

Figures 8A, 8B:
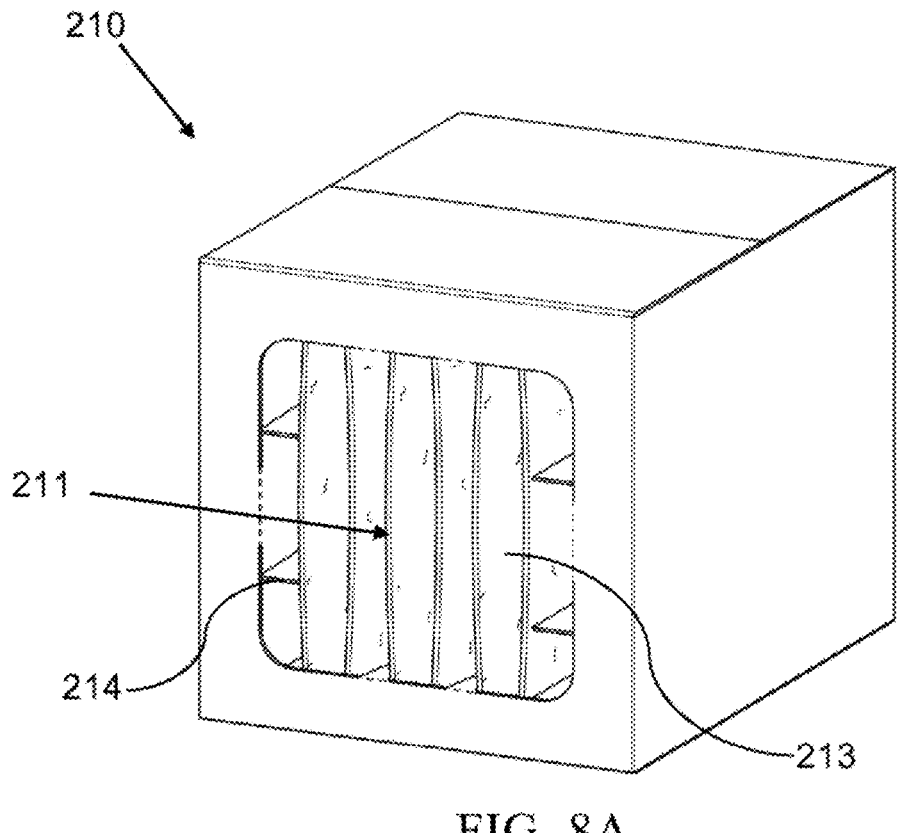
FIG. 8A shows a perspective view of a filter box, according to one embodiment of the present disclosure.
FIG. 8B shows a top inside view of a filter box, according to one embodiment of the present disclosure.

FIGS. 8A and 8B show a filter box (210), according to an example of the present disclosure. The filter box (210) shown in the figures and described herein is offered as an example filter box for illustrative purposes. In some embodiments, the filter material 213 is a continuous sheet folded back and forth between walls of the filter box (210) and held in place by support tabs (214). In some embodiments, the filter box (210) can be configured to form an airtight friction fit between other components of the filter assembly (200), namely the filter support frame (100), the inlet filter blanket (250), and/or the outlet filter blanket. In this way, the filter assembly (200) can ensure the mixture of air and particulates is directed through the filter boxes (210) rather than around the filter boxes (210). The filter material (213) can include multiple layers of various filter materials, and the layers can optionally be bonded together as would be advantageous for filtering paint overspray.

Figure 9:
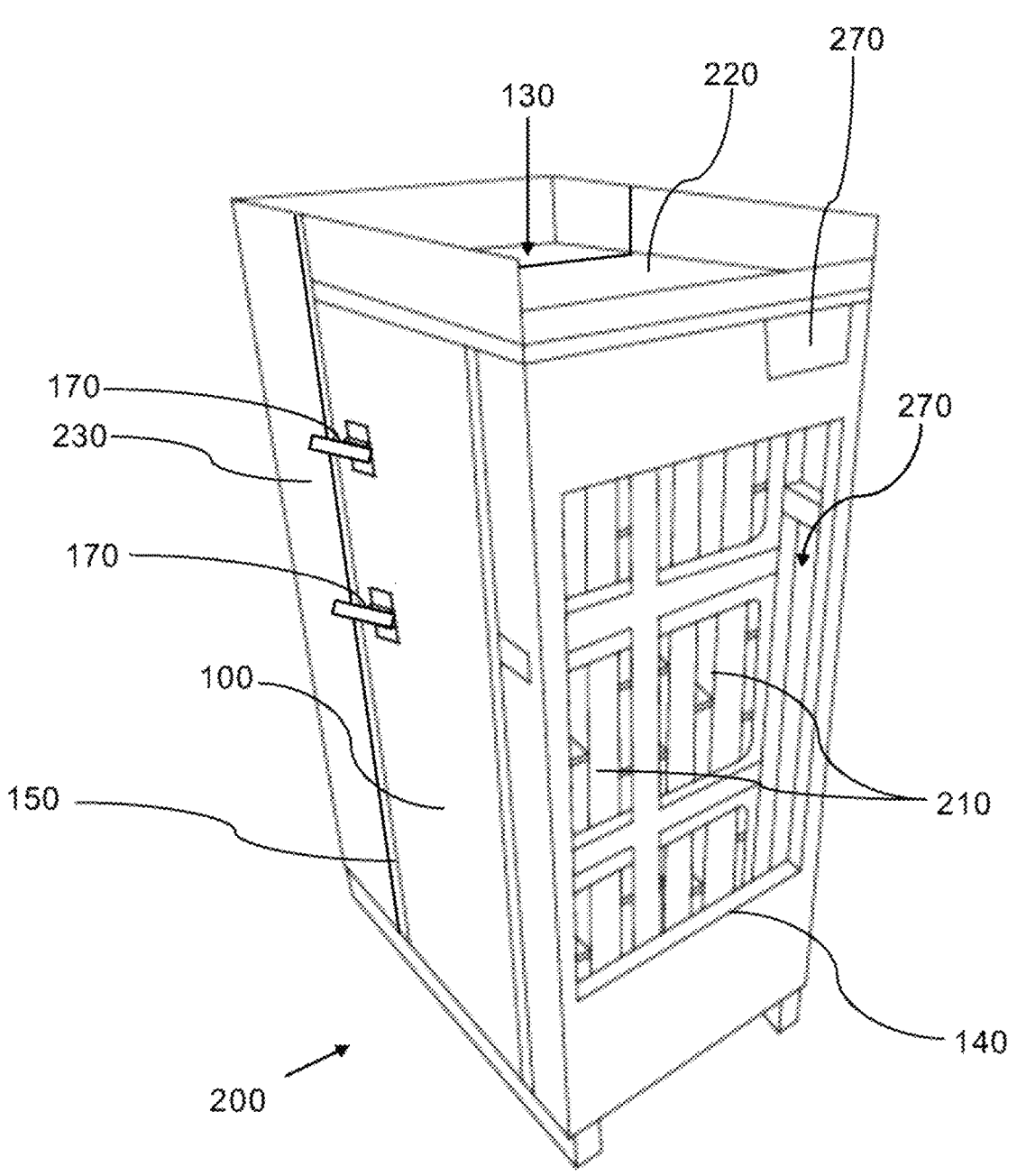
FIG. 9 shows a perspective view of a filter assembly, according to one embodiment of the present disclosure.

FIG. 9 shows a filter assembly (200) according to one example of the present disclosure. As previously described, the filter support frame (100) can include an outlet (140) that is configured to permit filtered air to pass therethrough. As shown in FIG. 9, the outlet (140) can be sized smaller than the side of the filter assembly (200) on which the outlet (140) is formed. In this way, the air can be directed from the filter boxes (210) and toward the outlet (140) as the airflow path (201) shown in FIG. 3. The outlet (140) can be sized to conform to other components of a paint filtration system such as a duct so that the filtered air is routed to a preferred location or is recirculated through the paint filtration system. Furthermore, as shown in FIGS. 3 and 9, the outlet (140) can be spaced a distance away from the filter boxes (210) to form a leaving-air-side plenum (142) through which the filtered air can flow after exiting the paint filter boxes (210) and being directed out the outlet (140). The leaving-air-side plenum (142) can be sized to permit a sufficient amount of air flow through the leaving-air-side plenum (142) to ensure no negative impacts to airflow or pressure are caused by the leaving-air-side plenum (142). In some examples, as shown in FIG. 3, one or more of the shelves (110) can extend to a wall in which the outlet (140) is formed such that the shelf creates a seal preventing air entering into the inlet (130) from flowing directly toward the outlet (140). For example, as shown in FIG. 3, the top shelf (110) can extend to the wall forming the outlet (140) and the leaving-air-side plenum (142) can be formed in the space beneath the top shelf (110) where the lower shelves (110) do not extend to the wall. In this way, the leaving-air-side plenum (142) can be formed. To illustrate, the filter box outlets (212) of the filter boxes (210) placed on the lower shelves (110) can be approximately six inches from the wall forming the outlet (140) to form a gap between the filter boxes (210) and the wall thereby forming the leaving-air-side-plenum (142). In other examples, the shelves (110) can be spaced at varying distances away from the wall forming the outlet (140) such that the leaving-air-side plenum (142) to affect the airflow path (201). In still other examples, the shelves (110) can extend all the way to the wall forming the outlet (140).

The tray receptable (120) can be a flat surface that is generally horizontal and creates a seal to guide the mixture of air and particulates toward the inlet (130). In other examples the tray receptacle (120) can be sloped so as to direct air flow towards the inlet (130) formed between the air filter frame (100) and the removable plenum (230). In this way, the tray receptacle (120) can help to guide the mixture of air and particulates into the inlet (130) formed between the air filter frame (100) and the removable plenum (230). The mixture of air and particulates can then be guided through each of the paint filter boxes (210) as described herein.

The filter assembly (200) can include an electronic identifier (270). The electronic identifier (270) can provide information about the filter assembly (200) and/or the filter boxes (210) and can be used to determine the performance of the filter assembly (200) and/or the filter boxes (210) based on data received from various sensors throughout a filtration system. For example, the electronic identifier (270) can store data that can be used to determine the age of the filter boxes (210) (hours of operation since installed), filtration efficiency, saturation, and/or remaining life of various components of the filter assembly (200). The electronic identifier (270) can come installed on the filter support frame (100) or it can simply comprise a cover or pocket that can receive an electronic card or identifier to allow reading by a sensor of the air filtration system (not shown). The cover or pocket, for example, can comprise plastic, fiberglass, acrylic, corrugated material, or the like and be configured to receive the electronic identifier (270). The sensor of the air filtration system (not shown) can be configured to receive data from the electronic identifier (270) and provide that data to the air filtration system. For example, the sensor can comprise a barcode reader, a radiofrequency (RF) sensor, a near field communication (NFC) device, a Bluetooth sensor, or the like.

It is to be understood that the examples and claims disclosed herein are not limited in their application to the details of construction and arrangement of the components set forth in the description and illustrated in the drawings. Rather, the description and the drawings provide examples of the embodiments envisioned. The examples and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A filter support frame comprising:
   a plurality of air filter receptacle shelves configured to support a plurality of air filter boxes;
   a ridge extending vertically along at least a portion of an exterior of the filter support frame, the ridge configured to abut against an edge of a removable plenum when the removable plenum is installed with the filter support frame;
   a clamp disposed on the exterior of the filter support frame proximate to the ridge and configured to clamp the removable plenum against at least a portion of the exterior of the filter support frame to couple the removable plenum to the filter support frame;
   a tray receptacle configured to receive a removable tray, the removable tray being configured to collect particulates;
   an inlet defined at least in part by the tray receptacle and the removable plenum when installed with the filter support frame, the inlet being configured to receive a mixture of air and particulates and channel the mixture of air and particulates at least partially across the removable tray toward the plurality of air filter boxes; and an outlet configured to receive filtered air from the plurality of air filter boxes and channel the filtered air out of the filter support frame, wherein the filter support frame is configured to channel the mixture of air and particulates through each air filter box of the plurality of the air filter boxes simultaneously, and wherein the ridge is spaced a distance away from an inlet end of the filter support frame such that at least a portion of the removable plenum overlaps the exterior of the filter support frame when the removable plenum is installed with the filter support frame and abutting the ridge.

2. The filter support frame of claim 1 further comprising a base comprising:

a groove configured to receive the removable plenum, the removable plenum being configured to direct the mixture of air and particulate from the inlet toward the plurality of air filter boxes; and a bottom tray receptacle configured to receive a removable bottom tray configured to collect particulates.

3. The filter support frame of claim 2 further comprising a plurality of clamps, each clamp of the plurality of clamps being configured to couple the removable plenum to the filter support frame.

4. The filter support frame of claim 1, wherein the removable plenum is made from a disposable corrugated material.

5. The filter support frame of claim 2, wherein the removable tray and the removable bottom tray are each made from a disposable corrugated material.

6. The filter support frame of claim 1, wherein the plurality of air filter receptacle shelves comprises three shelves and the plurality of air filter boxes comprises six air filter boxes.

7. The filter support frame of claim 1, wherein at least one of the plurality of air filter boxes comprises a filter box inlet, a filter box outlet, and a folded filter medium disposed between the inlet and the outlet.

8. The filter support frame of claim 1, wherein the filter support frame is made from a metal material.

9. A filter assembly comprising:

a filter support frame comprising:

a plurality of air filter receptacle shelves configured to support a plurality of air filter boxes;

a ridge extending vertically along at least a portion of an exterior of the filter support frame;

a clamp disposed on the exterior of the filter support frame proximate to the ridge;

a tray receptacle;

an inlet configured to receive a mixture of air and particulates and channel the mixture of air and particulates toward the plurality of air filter boxes; and an outlet configured to receive filtered air from the plurality of air filter boxes and channel the filtered air out of the filter support frame;

a removable tray configured to collect particulates; and a removable plenum, the removable plenum being configured to direct the mixture of air and particulates from the inlet toward the plurality of air filter boxes, the inlet being defined at least in part by the tray receptacle and the removable plenum when installed with the filter support frame;

wherein the filter support frame is configured to channel the mixture of air and particulates through the plurality of air filter boxes simultaneously, wherein the ridge is configured to abut against an edge of the removable plenum when the removable plenum is installed with the filter support frame, and wherein the clamp is configured to clamp the removable plenum against at least a portion of the exterior of the filter support frame to couple the removable plenum to the filter support frame wherein the ridge is spaced a distance away from an inlet end of the filter support frame such that at least a portion of the removable plenum overlaps the exterior of the filter support frame when the removable plenum is installed with the filter support frame and abutting the ridge.

10. The filter assembly of claim 9, wherein the tray receptacle is disposed proximate the inlet.

11. The filter assembly of claim 9 further comprising a base, the base comprising:

a groove configured to receive at least a portion of the removable plenum; and a bottom tray receptacle configured to receive a removable bottom tray, the removable bottom tray configured to collect particulates.

12. The filter assembly of claim 9 further comprising an inlet filter blanket removably attached to the filter support frame between the inlet and the plurality of air filter receptacle shelves.

13. The filter assembly of claim 9, wherein the plurality of air filter receptacle shelves comprises three shelves and the plurality of air filter boxes comprises six air filter boxes.

14. The filter assembly of claim 11, wherein the removable tray and the removable bottom tray are made from a disposable corrugated material.

15. The filter assembly of claim 9, wherein at least one of the plurality of air filter boxes comprises a filter box inlet, a filter box outlet, and a folded filter medium disposed between the inlet and the outlet.

16. The filter assembly of claim 9, further comprising a plurality of clamps, each clamp of the plurality of clamps being configured to secure the removable plenum to the filter support frame.

17. The filter assembly of claim 9, wherein the removable plenum is made from a disposable corrugated material.

18. The filter assembly of claim 9, wherein the filter support frame is made from a metal material.

19. The filter assembly of claim 9 further comprising an electronic identifier configured to store and output information corresponding to the filter assembly.

* * * * *